United States Patent Office 3,000,967
Patented Sept. 19, 1961

3,000,967
ALPHA-OMEGA-DINITROALKANES

Karl Klager, Monrovia, Calif., assignor to Aerojet-General Corporation, Azusa, Calif., a corporation of Ohio
No Drawing. Filed Nov. 9, 1953, Ser. No. 391,129
4 Claims. (Cl. 260—644)

This invention relates to a new method for the preparation of α,ω-dinitro alkanes having the following general formula:

$$O_2N-CH_2-A-CH_2-NO_2$$

wherein A is an alkylene radical having at least two carbon atoms.

These compounds find valuable use as intermediates in the preparation of propellant and explosive compositions. They readily undergo oxidative nitration in the presence of sodium nitrite and silver nitrate to produce polynitro compounds which are valuable high explosives.

Heretofore α,ω-dinitroalkanes have been prepared from the corresponding α,ω-diiodoalkanes by treating them with silver nitrite in accordance with the general reaction scheme set forth below:

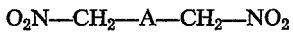
$$O_2N-CH_2-A-CH_2-NO_2$$

wherein A is an alkylene radical having at least two carbon atoms. Unfortunately, however, the α,ω-diiodides are expensive materials and are not readily available. Also, the silver nitrite employed in this process is recovered as a silver halide and requires extensive processing before the silver is again obtained in a useful form.

I have now found that α,ω-dinitro alkanes may be conveniently prepared by the reduction of α,α,ω,ω-tetrahalo-α,ω-dinitro alkanes in accordance with the general reaction scheme set forth below:

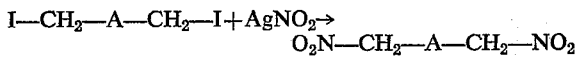

wherein X is a chlorine or bromine radical and A is an alkylene radical having at least two carbon atoms.

A variety of reducing agents such as lithium aluminum hydride and aluminum isopropoxide are known to replace halide radicals with hydrogen radicals. However, ordinarily the reduction is accompanied by a high percentage of nitro group destruction. These conventional reducing agents may be employed under closely controlled conditions; however, I prefer to use sodium borohydride, whose reducing action is limited to the halogen radical.

The reduction of the dinitro-tetrahalo compounds is usually conducted in the presence of an inert organic solvent such as ethanol. The pH of the reaction mixture is maintained acidic and preferably below about 6.

The dinitro-tetrahalo alkanes employed in carrying out my invention may be prepared by halogenation of α,α-dinitro-cycloketones in the presence of an alkali hydroxide, as disclosed in my copending application No. 235,570, filed July 6, 1951.

The following examples are presented to more fully illustrate the invention. These examples are presented merely as a means of illustration and are not intended to limit the scope of my invention in any way.

EXAMPLE I

Preparation of 1,4-dinitrobutane

A reactor provided with a stirrer, thermometer and burette, was charged with 6.8 gm. of 1,1,4,4-tetrabromo-1,4-dinitrobutane in 100 ml. of methanol. A solution of 3 gm. sodium borohydride in 30 ml. water was added dropwise. The pH of the mixture was maintained at about 4 to 5 by adding 30% sulfuric acid dropwise to the mixture. The temperature of the mixture was kept below 35° C. during the addition of the reducing agent. The product was recovered by acidifying the reaction mixture, distilling off the methanol, extracting the remaining water solution with ether, and distilling the ether solution. The resulting oil crystallized upon cooling and was recrystallized from ethanol. The crystals obtained had a melting point of 30–33° C., and were found to be identical with 1,4-dinitrobutane.

EXAMPLE II

Preparation of 1,5-dinitropentane 1,5-dinitropentane was prepared by reducing 1,1,5,5-tetrachloro-1,5-dinitropentane with sodium borohydride following the procedure described in Example I.

This invention provides a rapid and convenient method for the preparation of α,ω-dinitroalkanes employing inexpensive and readily obtainable materials. A wide range of tetrahalo-dinitroalkanes, which if desired may contain alkyl side chains, aryl groups or functional groups such as hydroxyl radicals, may readily be prepared from commercially available cycloketones. It is apparent that by selecting an appropriate tetrahalo-dinitroalkane and reducing it with sodium borohydride in accordance with the teachings of this invention, that any one of a wide variety of α,ω-dinitroalkanes may be prepared.

I claim:
1. The method of preparing α,ω-dinitro alkanes having the formula:

$$O_2N-CH_2-A-CH_2-NO_2$$

wherein A is a lower alkylene radical having at least 2 carbon atoms, which comprises reducing a nitroalkane having the formula:

wherein A is a lower alkylene radical having at least 2 carbon atoms and X is a radical selected from the group consisting of chloro and bromo radicals with a reducing agent selected from the group consisting of lithium aluminum hydride, aluminum isopropoxide and sodium borohydride in acid media.

2. The method of claim 1 wherein the reduction is conducted in the presence of sodium borohydride.

3. The method of preparing 1,4-dinitrobutane which comprises reducing 1,1,4,4-tetrabromo-1,4-dinitrobutane with sodium borohydride in acid media.

4. The method of preparing 1,5-dinitropentane which comprises reducing 1,1,5,5-tetrachloro-1,5-dinitropentane with sodium borohydride in acid media.

References Cited in the file of this patent
UNITED STATES PATENTS 2,534,533      Schlesinger et al. _____ Dec. 19, 1950

OTHER REFERENCES

Deutsche Chemische Gesellschaft Berichte, vol. 26 (1893), (pages 3003–3006).

An Outline of Organic Nitrogen Compounds, by Ed. F. Degering, University Lithoprinters, Ypsilanti, Michigan 1945, page 86.

Whitmore: "Organic Chemistry," published by D. Van Nostrand Co. (N.Y., N.Y.), 1937. (Pg. 180 relied on, copy in Sci. Library.)